United States Patent Office 2,778,829
Patented Jan. 22, 1957

2,778,829

NEW 5:6-DIHYDRO-BENZO (C) CINNOLINE DERIVATIVES AND A PROCESS FOR THEIR PREPARATION

Max Matter, Worb, near Berne, Switzerland, assignor to Haco Gesellschaft A. G., Gumligen, Berne, Switzerland No Drawing. Application January 10, 1955,
Serial No. 480,990

Claims priority, application Switzerland January 20, 1954

7 Claims. (Cl. 260—250)

The present invention relates to new 5:6-dihydrobenzo-(c)cinnoline derivatives corresponding to the following general formulae:

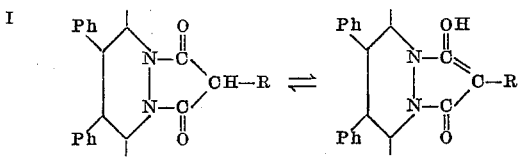

wherein each Ph represents a phenylene radical which may be either unsubstituted or substituted by at least one lower alkyl group and R represents hydrogen or a hydrocarbon radical containing not more than 10 carbon atoms which may contain an oxygen atom forming an ether linkage, and to salts of these derivatives with bases. The invention relates also to a process for preparing these new derivatives and the salts thereof with bases.

The present invention relates particularly to those derivatives of the above Formula I in which the phenylene radicals are unsubstituted and in which R is hydrogen or a saturated or unsaturated alkyl, cycloalkyl, ether, or cyclic ether radical containing from 3 to 6 carbon atoms.

The new 5:6-dihydro-benzo(c)cinnoline derivatives possess valuable pharmacological properties or constitute valuable intermediates for the preparation of pharmaceuticals. Many of the new derivatives have a pronounced analgesic and antiphlogistic activity and can, therefore, be used for combatting inflammatory, particularly rheumatic affections.

It is a remarkable fact that the new derivatives have acidic properties and are capable of forming salts with bases such as, e. g., potassium hydroxide, lithium hydroxide, barium hydroxide, trimethylammonium hydroxide, triethylammonium hydroxide and α,ω-bis(trimethylammonium)-hexane dihydroxide. Certain of these salts, particularly the alkali metal salts, can, as a rule, be dissolved in water without using an excess of the corresponding base to form clear aqueous solutions. Such aqueous solutions are only weakly alkaline and are highly suitable for intramuscular and subcutaneous injections. Many of the easily water-soluble salts of the new derivatives are good solubilisers and can be used for preparing relatively concentrated aqueous solutions of sparingly water-soluble pharmaceuticals such as, e. g., aminopyrine. The said salts as well as the free acids may also be administered in solid form, for example in the form of tablets, pills or gelatin capsules.

According to the present invention the new 5:6-dihydro-benzo(c)cinnoline derivatives represented by Formula I are prepared by a process which comprises reacting a compound represented by the general formula

II

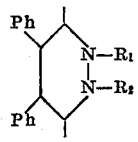

wherein each Ph represents a phenylene radical which may be either unsubstituted or substituted by at least one lower alkyl group, $R_1$ represents hydrogen, an alkali metal or an acyl group, and $R_2$ represents hydrogen, an alkali metal or an acyl group, with such compounds that are capable of replacing the radicals $R_1$ and $R_2$ in one or more than one step by the bivalent radical of the formula

III

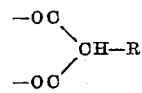

wherein R has the meaning defined hereinbefore, and, if desired, converting the obtained 5:6-dihydro-benzo(c)-cinnoline derivative into a salt with a base by a conventional method.

In order to simplify nomenclature the expression "alkyl-substituted 5:6-dihydro-benzo(c)cinnoline" will be used hereinafter to designate 5:6-dihydro-benzo(c)cinnoline derivatives in which at least one of the benzene nuclei carries at least one lower alkyl radical.

The reactions carried out "in one step" are those in which a compound corresponding to Formula II is reacted with a compound yielding the radical represented by the Formula III in one and the same step to form a compound corresponding to Formula I.

The reactions carried out "in more than one step" are those in which an intermediate of the formula

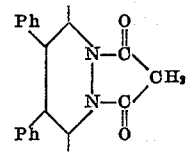

wherein the Ph's have the meaning defined hereinbefore is first prepared by reacting a compound of Formula II with a compound yielding the malonyl radical,

and a radical R having the meaning defined hereinbefore with exclusion of hydrogen, is introduced into the intermediate to obtain a compound corresponding to Formula I, or in which an intermediate having the formula

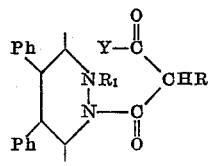

wherein $R_1$ has the meaning defined hereinbefore and R represents a hydrocarbon radical containing not more than 10 carbon atoms which may contain an oxygen atom forming an ether linkage, is first prepared by reacting a compound of Formula II with a compound yielding the radical

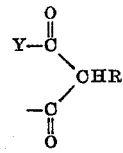

wherein Y represents a functional group capable of being split off, the obtained intermediate being then subjected to ring closure.

In one method of carrying out the process according to the present invention 5:6-dihydro-benzo(c)cinnoline or an alkyl-substituted 5:6-dihydro-benzo(c)cinnoline in free form or in the form of a salt with a strong acid is reacted in the presence of an acid binding agent, e. g. pyridine or diethylaniline with malonyl chloride or a mono-substituted malonyl chloride having the following formula

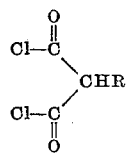

wherein R has the meaning defined hereinbefore. As 5:6-dihydro-benzo(c)cinnoline and the alkyl-substituted 5:6-dihydro-benzo(c)cinnolines are easily converted into the corresponding benzo(c)cinnolines under the influence of even weak oxidizing agents such as air, it is advisable to effect the reaction between the cinnoline component and the malonyl or substituted malonyl chloride with exclusion of oxygen, for example in an atmosphere of nitrogen or hydrogen.

According to another mode of execution of the process according to the present invention 5:6-dihydro-benzo(c)cinnoline or an alkyl-substituted 5:6-dihydro-benzo(c)cinnoline, or an N-acyl or N:N'-diacyl derivative thereof, e. g. N-acetyl-5:6-dihydro-benzo(c)cinnoline or N:N'-diacetyl-5:6-dihydro-benzo(c)cinnoline, is condensed, preferably also in the absence of oxygen, with a malonic ester or a mono-substituted malonic ester at elevated temperatures in the presence of a condensing agent, e. g. of a compound capable of replacing a mobile hydrogen atom by a metal atom. Condensing agents comprised in this definition are for example sodium ethoxide, potassium tert.-butoxide, sodium amide and phenyl-lithium. The preferred condensing agent is sodium alcoholate. Examples of acyl derivatives which can be used are the N-acetyl and N:N'-diacetyl derivatives, e. g. N-acetyl-5:6-dihydro-benzo(c)cinnoline and N:N'-diacetyl-5:6-dihydrobenzo(c)cinnoline.

If 5:6-dihydro-benzo(c)cinnoline or an alkyl-substituted 5:6-dihydro-benzo(c)cinnoline in the unacylated form is used as starting material it is advantageous owing to the instability of these compounds to prepare freshly the starting compound and to react it immediately in the same reaction vessel with the compound yielding the malonyl or substituted malonyl radical. Thus, for example, benzo(c)cinnoline may be hydrogenated with dry hydrogen, at room temperature in the presence of diethyl malonate or a substituted diethyl malonate and of more than 1 mole of sodium alcoholate dissolved in ethanol and in the presence of a hydrogenation catalyst, such as platinum or palladium, to form 5:6-dihydro-benzo(c)cinnoline which may then be condensed immediately and without preliminary isolation by heating to form N:N'-malonyl-5:6-dihydro-benzo(c)cinnoline. Thus, it is possible to convert benzo(c)cinnolines in a simple manner in the same reaction vessel directly into N:N'-malonyl-5:6-dihydro-benzo(c)cinnolines.

It is also possible, according to a further mode of execution of the present process, to react the said compounds yielding the malonyl radical or a substituted malonyl radical with the alkali metal salts of 5:6-dihydro-benzo(c)cinnolines which may be obtained, as is known, from the benzo(c)cinnolines and the corresponding alkali metals by shaking or stirring the reaction components in the presence of suitable solvents, e. g. ether at room temperature.

For carrying out the process according to the present invention it is furthermore possible to use malonic acid or substituted malonic acids carrying as substituent a hydrocarbon radical containing not more than 10 carbon atoms which may contain an oxygen atom forming an ether linkage as the compounds yielding the malonyl or substituted malonyl radical. Thus, for example N:N'-(alkyl-malonyl)-5:6-dihydro-benzo(c)cinnolines are obtained from N-acetyl-5:6-dihydro-benzo(c)cinnoline and alkyl-malonic acids by heating in the presence of acidic condensing agents such as phosphorus trichloride, or thionyl chloride.

According to a further mode of execution of the present process it is possible to convert a compound corresponding to Formula I wherein R is hydrogen, which may be obtained for example by any of the methods described hereinbefore, into a compound corresponding to Formula I wherein R is a hydrocarbon or ether radical containing not more than 10 carbon atoms, because the CH$_2$ group in the malonyl radical is easily alkylated like that in diethyl malonate. Such alkylations may be carried out by known methods, for example by means of reactive esters of alcohols or ether-alcohols with sulfonic acids, hydrohalic acids and sulphuric acid. Tetrahydrofurfuryl p-toluene-sulfonate, isopropyl methane-sulfonate, butyl bromide, phenoxyethyl bromide, dimethyl sulfate, etc., are examples of such reactive esters. It is, however, more advantageous to use the method of reductive alkylation in a hydrogen atmosphere, for example by means of acetone, butyraldehyde, furfural or benzaldehyde in glacial acetic acid or ethanol in the presence of catalysts such as platinum, palladium or Raney nickel and in the presence of condensing agents such as piperidine acetate or ammonium acetate. Alternatively the reductive alkylation may be carried out in more than one step by condensing a compound corresponding to Formula I, wherein R is hydrogen, with the carbonyl compound of the formula $R_3$=O, wherein $R_3$ represents a bivalent hydrocarbon radical comprising not more than 10 carbon atoms which may contain an oxygen radical forming an ether bridge, to obtain a compound of the formula IV 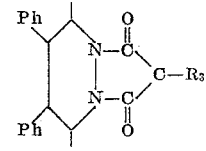

wherein $R_3$ has the meaning defined above, and then hydrogenating the C=$R_3$ double bond. In this case the hydrogenation is best carried out with hydrogen in the presence of a hydrogenation catalyst.

The reductive alkylation is particularly suitable for the preparation of those derivatives of the Formula I in which R is a saturated hydrocarbon or ether radical. If the carbonyl compound which is used contains an aliphatic unsaturated carbon-carbon bond, this bond is normally also hydrogenated in the reductive alkylation.

Finally the process according to the present invention may also be carried out by reacting 5:6-dihydro-benzo(c)cinnoline or an alkyl-substituted 5:6-dihydro-benzo(c)cinnoline in the presence of a condensing agent with a compound yielding the radical of the formula V 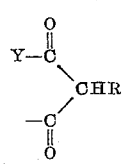

VI 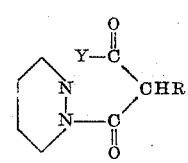

wherein Y represents a functional group capable of being split off and R is a hydrocarbon or ether radical containing not more than 10 carbon atoms, to form an intermediate of the Formula VI and then subjecting this intermediate to ring closure with elimination of HY. As a compound capable of yielding the radical of the Formula V we may use, for example, an ester chloride of the formula Cl—CO—CH(R)—COOalkyl.

In a preferred mode of carrying out the process according to the present invention such reactants are used which will yield the compounds which have been referred to as preferred compounds in the introductory part of the present specification.

The compounds used as starting materials for the present process are known or may be obtained by known methods. The N-acyl and N:N'-diacyl-5:6-dihydro-benzo-(c)cinnolines which owing to their stability are particularly suitable as starting materials may be obtained by treating the corresponding 5:6-dihydro-benzo(c)cinnolines with acylating agents such as acetic anhydride, ketene, benzoyl chloride or butyryl chloride.

The new compounds obtained according to the present invention can be used as medicaments in the form of pharmaceutical preparations containing said compounds in admixture with a pharmaceutical adjuvant as a carrier facilitating the administration thereof, e. g. a pharmaceutical organic or inorganic carrier material suitable for enteral, parenteral or oral application. For the production of these preparations inert pharmaceutical adjuvants are employed as carriers, namely, such substances as do not react with the new compounds, as for example water, gelatin, lactose, starches, magnesium stearate, talcum, vegetable oils, benzyl alcohols, gums, polyalkylene glycols, petroleum jelly, cholesterol, or other known medicament carriers. The pharmaceutical preparations can be made up, for example, as tablets, dragees, or in liquid form as solutions, suspensions or emulsions, e. g. in the form of elixirs. They are sterilized, if desired, and/or may contain auxiliary substances such as preservative, stabilising, wetting or emulsifying agents, salts which modify the osmotic pressure, or buffer substances. They may also contain other therapeutically valuable substances, as for example antipyrine, procaine, α-diethylamino-2:6-aceto-xylidide, salicylamide, ascorbic acid, the calcium complex salt of di-sodium salt of ethylenediamine tetraacetic acid, p-(di-n-propyl-sulfamyl)-benzoic acid or methionine-methylsulfonium iodide.

The present invention will now be illustrated but not limited by the following examples in which the relation between part by weight and part by volume is the same as between gram and milliter. Temperatures are given in degrees centrigrade.

*Example 1*

11 parts by weight of 5:6-dihydro-benzo(c)cinnoline hydrochloride or an equivalent amount of the free base, which have been carefully dried, are stirred with 250 parts of volume of absolute ether in the absence of air and humidity and 10 parts by weight of n-butyl-malonyl chloride are added to the mixture. After cooling to about —10°, 50 parts by volume of absolute pyridine are run into the mixture from a dropping funnel. After rinsing the residual pyridine from the dropping funnel with ether the reaction mixture is further stirred for half an hour in an ice-bath, then for one hour at 20–25° and finally for 1½ hours at 30–35°.

The weakly violet-coloured slurry is rinsed into a separating funnel with a small quantity of ether and 500 parts by volume of 2 N hydrochloric acid. After shaking the mixture the aqueous layer is discharged into a second separating funnel and extracted with a further 300 parts by volume of ether. The obtained two ether extracts are extracted separately and successively thrice with portions of 500 parts by volume of 2 N hydrochloric acid and then thrice with portions of 150 parts by volume of 2 N caustic soda solution. The combined alkaline extracts are stirred with ice and made acid to Congo by adding slowly concentrated hydrochloric acid. In this manner 13 parts by weight of crude N:N'-(n-butyl-malonyl)-5:6-dihydro-benzo(c)cinnoline of the formula

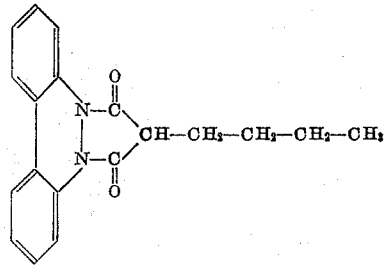

are precipitated in the form of pale greenish-yellow crystals. 7.1 parts by weight of pure, substantially colourless crystals melting at 140° are obtained by dissolving the crude product in 400 parts by volume of boiling methanol, concentrating the solution until crystals being to separate, cooling the mixture to 0° and filtering by suction. The obtained new substance is well soluble in benzene and in dilute sodium carbonate solution and may be recrystallised from a mixture of benzene and gasoline (mixing ratio 3:7).

An aqueous solution of the sodium salt of the new compound having the following probable formula:

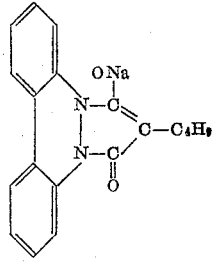

has a pale yellow colour and is only weakly alkaline (acid to phenolphthalein).

*Example 2*

95 parts by weight of benzo(c)cinnoline are shaken together with 30 parts by weight of small pieces of lithium wire in 5000 parts by volume of absolute ether for 24 hours with exclusion of air oxygen and humidity. A dark green solution of the di-lithium salt of 5:6-dihydro-benzo(c)cinnoline is obtained. After separation of the excess of lithium metal, still with exclusion of oxygen and humidity, 100 parts by weight of n-butyl-malonyl chloride are added. The green solution immediately loses its colour and a crystalline percipitate separates. The filtered ethereal solution is extracted with 2 N caustic soda solution. When the alkaline solution is acidified, a brown resin separates. On extraction of the mixture with ether this resin dissolves again. After drying over sodium sulphate the ethereal solution may be purified by chromatography on alumina. On elution with ether the brown-coloured impurities remain adsorbed on the alumina. On evaporation of the ethereal eluates a pale yellow oil is obtained. By crystallising this oil from a 1:1 mixture of ether and petroleum ether crystals melting at 140° are obtained which, when mixed with crystals obtained as described in Example 1, give no depression of the melting point.

*Example 3*

In a flask fitted with a dropping funnel and a stirrer, 50 parts by volume of ether and 25 parts by volume of pyridine are stirred at 0° with exclusion of humidity and oxygen (i. e. for example in a nitrogen or hydrogen atmosphere), and 3.4 parts by volume of methyl-malonyl dichloride are slowly added to the mixture. A light yellow crystalline precipitate is formed. Then 4.4 parts by weight of 5:6-dihydro-benzo(c)-cinnoline hydrochloride or an equivalent quantity of the free base are added. During this addition a local red coloration appears, but disappears again on stirring the mixture. The temperature is allowed to rise slowly, and the mixture is stirred for a further 3 hours at 20–30°.

Then the reaction mixture is diluted with 100 parts by volume of ether and a solution of 25 parts by volume of concentrated hydrochloric acid in 125 parts by volume of water with cooling. The abundant precipitate which forms is filtered off by suction, and the filtrate is introduced into a separating funnel. The precipitate and the ethereal solution are washed separately several times with dilute hydrochloric acid. The precipitate is stirred with 50 parts by volume of 2 N sodium carbonate solution, the precipitate being almost entirely dissolved. The ethereal solution is extracted first with the obtained alkaline extract and then twice with portions of 100 parts by volume of 1 N sodium carbonate solution. After removal of a small quantity of ether by evaporation, the combined sodium carbonate solutions are filtered and the clear filtrate is made acid to Congo by adding concentrated hydrochloric acid to form a light yellow precipitate which is filtered off, washed until the washings are neutral and dried. In this manner 4.5 parts by weight of a product consisting of substantially pure N:N'-(methyl-malonyl)-5:6-dihydro-benzo(c)-cinnoline of the formula

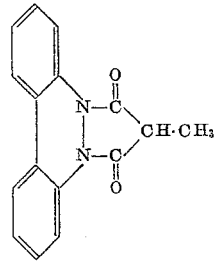

are obtained. The new compound is fairly well soluble in dioxane and may be recrystallized from a large quantity of ethanol. The pure crystals melt at 205–206°.

*Example 4*

4.4 parts by weight of 5:6-dihydro-benzo(c)cinnoline hydrochloride, 50 parts by volume of ether and 4.1 parts by weight of isopropyl-malonyl chloride are stirred together in a nitrogen atmosphere at −10° with exclusion of humidity. Then a mixture of 35 parts by volume of pyridine and 10 parts by volume of ether is added within 20 minutes. After stirring for 3 hours at 20–30° the reaction mixture is discharged into a separating funnel by rinsing with 150 parts by volume of ether. After shaking, the aqueous layer is discharged into a second separating funnel containing 75 parts by volume of ether and the mixture is shaken. The obtained two ether extracts are extracted separately and successively with a mixture of 25 parts by volume of concentrated hydrochloric acid and 50 parts by volume of water, then twice with portions of 40 parts by volume of 2 N hydrochloric acid and finally three times with portions of 100 parts by volume of 1 N caustic soda solution. On acidification of the combined alkaline extracts with hydrochloric acid while cooling a light yellow crystalline precipitate is obtained which, after filtering off, washing until the washings are neutral and drying, yields 4.1 parts by weight of the compound represented by the following formula:

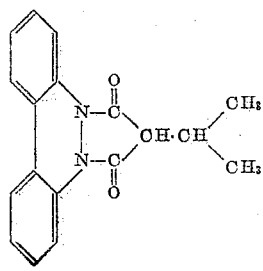

This compound may be obtained in pure form by recrystallisation from ethanol, ethyl acetate or benzene. The purified product melts at 149°. The solution of the sodium salt of this new compound in ten times its weight of water is clear and only very weakly alkaline.

The isopropyl-malonyl chloride used as starting material in this example can be obtained as follows: 14.6 parts by weight of isopropyl-malonic acid and 33 parts by volume of thionyl chloride are boiled under reflux. After about ¼ hour complete dissolution has taken place. After boiling the solution for 1 hour the excess of thionyl chloride is removed by distillation under somewhat reduced pressure. On distillation in vacuo 15 parts by weight of isopropyl-malonyl chloride boiling at 58°/11 mm. Hg are obtained in the form of a colourless liquid.

*Example 5*

By reacting 5:6-dihydro-benzo(c)cinnoline hydrochloride with sec.-butyl-malonyl chloride in the manner described in Example 4 the compound represented by the following formula

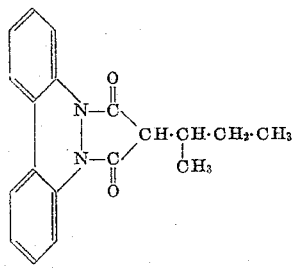

is obtained. It is soluble in dilute sodium carbonate solution and may be recrystallized from ethanol in the form of needles melting at 103°.

The sec.-butyl-malonyl chloride used as starting material may be prepared in the manner described in the last paragraph of Example 4 by reacting 16 parts by weight of sec.-butyl-malonic acid with 33 parts by volume of thionyl chloride. The sec.-butyl-malonyl chloride is obtained in the form of a colourless liquid boiling at 78°/11 mm. Hg.

*Example 6*

By reacting 5:6-dihydro-benzo(c)cinnoline hydrochloride with benzyl-malonyl chloride in the manner described in Example 4 there is obtained N:N'-(benzyl-malonyl)-5:6-dihydro-benzo(c)cinnoline of the formula

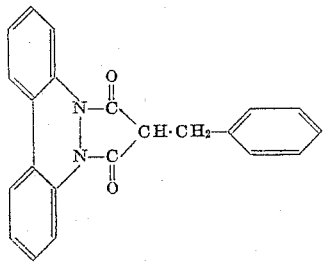

which may be obtained in the form of crystals melting at 190° from ethyl acetate or benzene, and the sodium salt of which is soluble in water.

*Example 7*

4.95 parts by weight of n-hexyl-malonyl chloride are stirred together with 50 parts by volume of ether at −12° to −15° in a nitrogen atmosphere with complete exclusion of oxygen and humidity, and 25 parts by volume of pyridine are added to the mixture. A light yellow precipitate is formed. Then 4.4 parts by weight of 5:6-dihydrobenzo(c)cinnoline hydrochloride are added. The mixture is stirred first for 20 minutes in a refrigerating mixture and then for 3 hours at room temperature.

A mixture of 25 parts by volume of concentrated hydrochloric acid and 75 parts by volume of water is added to the reaction mixture with cooling, and the mixture is discharged into a separating funnel by rinsing with 50 parts by volume of ether. After shaking the mixture the aqueous layer is discharged into a second separating funnel containing 50 parts by volume of ether and the mixture is again shaken. The obtained two ether extracts are extracted separately twice with portions of 30 parts by volume of 2 N HCl and then three times with portions of 100 parts by volume of 1 N sodium carbonate solution. The combined alkaline solutions are made acid to Congo by adding 20% hydrochloric acid while cooling. The light yellow crystalline precipitate which forms is filtered by suction, washed neutral and dried. The obtained substantially pure product corresponds to the following formula:

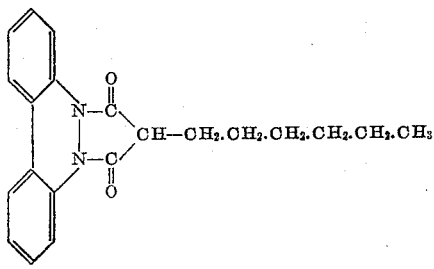

It may be recrystallised from a 1:1 mixture of benzene and petroleum ether and from ethanol. After recrystallisation it melts at 112°.

The n-hexyl-malonyl chloride used as starting material in this example may be obtained in the form of a colourless liquid boiling at 108°/11 mm. Hg by boiling 19 parts by weight of n-hexyl-malonic acid together with 35 parts by volume of thionyl chloride under reflux for one hour and subsequently distilling the reaction mixture.

*Example 8*

2.2 parts by weight of 5:6-dihydro-benzo(c)cinnoline hydrochloride, 3 parts by volume of acetic anhydride and 9 parts by volume of pyridine are mixed in an absolutely oxygen-free nitrogen atmosphere with exclusion of humidity. Due to a slight rise of the temperature caused by the exothermic reaction a clear solution is soon formed from which crystals begin to separate after a few minutes. The mixture is allowed to stand for several hours at room temperature and is then poured onto a mixture of 10 parts by volume of concentrated hydrochloric acid and 50 parts by weight of finely crushed ice to cause the separation of an oil. The mixture is discharged into a separating funnel by rinsing with 50 parts by volume of ether and shaken. The aqueous layer is then discharged into a separating funnel charged with 25 parts by volume of ether, and the mixture is again shaken. The obtained two ether extracts are extracted separately and successively twice with portions of 25 parts by volume of 2 N hydrochloric acid and then washed with 25 parts by volume of water. On evaporation of the combined ethereal solutions a solid residue is obtained. By crystallising this residue from a mixture of ether and petroleum ether, benzene and petroleum ether or methanol and water (mixing ratio 5:1) 2 parts by weight of pure N-acetyl-5:6-dihydro-benzo(c)cinnoline are obtained in the form of pale yellow crystals melting at 112°–113°.

2.3 parts by weight of this product and 2.16 parts by weight of diethyl n-butyl-malonate are added to a solution of 0.46 part by weight of sodium in 30 parts by volume of ethanol. The reaction is carried out in a distilling flask while a continuous stream of nitrogen, absolutely free of oxygen and humidity, is passed through the flask. The flask is maintained at a temperature of 135–140° for one hour in a heating bath, so that the ethanol distils off slowly. The crystalline residue is then heated in vacuo at 135–140° for three hours in a heating bath.

After cooling, the crystalline residue is dissolved in 50 parts by volume of water and the solution is extracted with 50 parts by volume of ether. The ethereal layer is extracted twice with a small quantity of 1 N sodium carbonate solution. On evaporation of the ether 0.1 part by weight of a neutral by-product is obtained. The combined aqueous solutions are shaken for a short time with 1.5 parts by weight of activated charcoal. As a result of this treatment the brown solution is substantially decolorised. After filtration the filtrate is made acid to Congo by addition of hydrochloric acid to cause the separation of a pale yellow precipitate which is filtered off, washed neutral and dissolved in about 40 parts by volume of boiling methanol. After cooling to 0° 2.1 parts of needles melting at 140° separate. These needles consist of pure N:N'-(n-butyl-malonyl)-5:6-dihydro-benzo(c)cinnoline and are identical with the product obtained according to Example 1. A further quantity of this product may be obtained by elution of the activated charcoal.

If di-ethyl tert.-butyl-malonate is used instead of diethyl n-butyl-malonate in the above-described condensation, N:N'-(tert.-butyl-malonyl)-5:6-dihydro-benzo(c)-cinnoline is obtained. The acid nature of this compound is less pronounced than that of N:N'-(n-butyl-malonyl)-5:6-dihydrobenzo(c)cinnoline.

*Example 9*

1.6 parts by weight of diethyl malonate and 2.3 parts by weight of N-acetyl-5:6-dihydro-benzo(c)cinnoline are dissolved in a sodium ethoxide solution obtained from 0.46 part by weight of sodium and 30 parts by volume of ethanol in an atmosphere of nitrogen with exclusion of oxygen and humidity. The solution is then heated to 130–140° in the course of about ¾ hour, the ethanol being allowed to distil off gradually. The residue is then heated for a further hour at 130–140° in a vacuum of 12 mm. Hg.

The residue is taken up in 50 parts by volume of water. The obtained brown solution is extracted with 50 parts by volume of ether and the ether extract is washed twice with 1 N sodium carbonate solution. By adding hydrochloric acid to the combined aqueous solutions a precipitate of pale greenish-yellow crystals is obtained in a yield of 2.2 parts by weight. By dissolving this product in 1 N caustic soda solution, treating the solution with 0.3 part by weight of activated charcoal, filtering the mixture and precipitating with mineral acid, 2.05 parts by weight of the substantially colourless compound corresponding to the formula

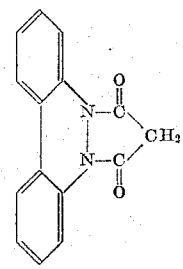

are obtained. This product may be recrystallised from ten times its quantity of ethylene-glycol monoethyl-ether or from a large quantity of ethanol and melts then at about 205–207° with decomposition.

The N:N'-malonyl-5:6-dihydro-benzo(c)cinnoline obtained in this manner may be converted into the N:N'-(n - butyl - malonyl) - 5:6 - dihydro - benzo(c)cinnoline described in Examples 1 and 8, for example by reductive butylation, i. e. by hydrogenation at room temperature and atmospheric pressure in a mixture of 2.5 parts by volume of N:N'-malonyl-5:6-dihydro-benzo(c)cinnoline, 0.05 part by volume of piperidine, 50 parts by volume of glacial acetic acid, 0.9 part by weight of butyraldehyde, and 0.5 part by weight of palladium-charcoal containing 5% of palladium.

*Example 10*

0.92 part by weight of sodium is dissolved in absolute ethanol. To the obtained solution 5 parts by weight of di-ethyl 3-methoxybutyl-malonate and 4.5 parts by weight of N-acetyl-5:6-dihydro-benzo(c)cinnoline are added, and then the alcohol is slowly distilled from the yellow solution in an atmosphere of dry nitrogen. The crystalline residue is heated for 2 hours at 130–135° in a vacuum of 10 to 15 mm. Hg and taken up in 100 parts by volume of water after cooling. The clear brown aqueous solution is extracted 4 times with portions of 50 parts by volume of chloroform and the combined chloroform extracts are washed with 100 parts by volume of 2 N sodium carbonate solution.

The combined aqueous layers are acidified with acetic acid to cause the separation of a crystalline pale yellow precipitate in a yield of 5.6 parts by weight. For purification, this product may be recrystallised from ethanol, a 1:1 mixture of ethyl acetate and gasoline or a 1:2 mixture of benzene and gasoline. In this manner N:N'-(3-methoxybutyl - malonyl) - 5:6 - dihydro-benzo(c)cinnoline corresponding to the formula

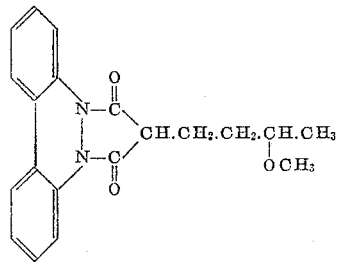

is obtained in the form of pale yellow needles melting at 105°.

The diethyl 3-methoxybutyl-malonate used as starting material in this example may be obtained as follows:

104 parts by weight of 3-methoxybutanol (which is commercially available) are stirred with 450 parts by volume of benzene, and simultaneously 180 parts by volume of benzene-sulphonic chloride and 72 parts by weight of powdered sodium hydroxide are added at 20–30° in the course of 1½ hours. After further stirring for several hours, the reaction mixture is well mixed with 450 parts by volume of water in a separating funnel and the aqueous layer is discharged into a second separating funnel and washed therein with 100 parts by volume of benzene. The combined benzene layers are shaken with 50 parts by volume of 34% ammonia for several hours and then for 10 minutes with 100 parts by volume of 2 N caustic soda solution. The benzene layer is separated from the aqueous layer and washed with 100 parts by volume of 2 N caustic soda solution and with 100 parts by volume of water. By evaporating the benzene solution and drying the residue in vacuo 201 parts by weight of 3-methoxybutyl benzene-sulphonate are obtained in the form of a pale yellow oil. 171 parts by weight of this oil are added within 3 hours with stirring to a solution of 16.1 parts by weight of sodium and 224 parts by weight of diethyl malonate in 350 parts by volume of absolute ethanol boiling under reflux. The separation of sodium benzene-sulphonate begins before all of the benzene-sulphonic ester has been added. After further heating of the reaction mixture under reflux for several hours, the larger portion of the ethanol is evaporated under reduced pressure and 250 parts by volume of water are added to the residue. The mixture is then extracted with ether. The ethereal layers are washed with water, dried over sodium sulphate and concentrated to an oily residue. On distillation of this residue in a fractionating column, after removal of the excess of diethyl malonate, 134 parts by weight of a uniform, colourless fraction boiling at 138–139°/12 mm. Hg and consisting of pure diethyl 3-methoxybutyl-malonate are obtained.

In this example diethyl or dimethyl 4-ethoxybutyl- or ethoxyethyl-malonate may be used in place of diethyl 3-methoxybutyl-malonate.

*Example 11*

To a solution of 0.92 part by weight of sodium in 75 parts by volume of absolute ethanol 5.1 parts by weight of diethyl tetrahydrofurfuryl-malonate and 4.5 parts by weight of N-acetyl-5:6-dihydro-benzo(c)cinnoline are added. The ethanol is distilled off within 3 hours by heating the mixture in an atmosphere of dry nitrogen in an oil bath. The crystalline greenish-yellow residue is then heated for one hour at 135–140° in a vacuum of 10 to 15 mm. Hg.

After cooling, the residue is dissolved in 80 parts by volume of water and the solution is extracted first with 50 parts by volume of chloroform and then twice with portions of 25 parts by volume of chloroform. All chloroform layers are washed with 30 parts by volume of 1 N caustic soda solution. The combined alkaline aqueous layers are shaken with 1.2 parts by weight of activated charcoal and then filtered with addition of diatomaceous earth. On acidifying the filtrate with acetic acid while cooling externally with ice water an oily light yellow product separates. This material is taken up in chloroform and the chloroform solution is washed with water and evaporated. The residue is dried by adding twice benzene thereto and evaporating the benzene in vacuo. On standing the residue crystallises spontaneously. By recrystallising the product from 40 parts by volume of ethanol 5.15 parts by weight of pale yellow crystals melting at 115° are obtained. The elementary analysis shows that these crystals consist of pure N:N'-(tetrahydrofurfuryl - malonyl) - 5:6 - dihydro - benzo-(c)cinnoline corresponding to the formula

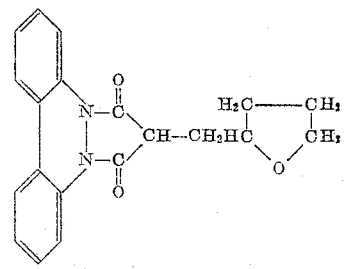

The brown impurity present in a very small quantity may be removed by filtering a benzene solution of the new substance through a column of alumina (according to Brockmann).

The new compound dissolves easily together with the equimolecular amount of diethylamino-ethanol in water to form a lemon-coloured solution. Such aqueous solutions are only very weakly alkaline (pH<8).

The sodium salt of the new compound may be obtained in the form of pale yellow, easily water-soluble crystals by dissolving 0.668 part by weight of the new compound in 5 parts by volume of ethanol, adding 1 part by volume of 2 N sodium methoxide solution to the solution and concentrating the solution under reduced pressure.

If 5:3 parts by weight of N:N'-diacetyl-5:6-dihydrobenzo(c)cinnoline are used in place of 4.5 parts by weight of N-acetyl-5:6-dihydro-benzo(c)cinnoline for the condensation described above, there are obtained, after recrystallisation from ethanol, 4.85 parts by weight of N:N'-(tetrahydrofurfuryl-malonyl)-5:6 - dihydro - benzo-(c)cinnoline melting at 115°.

N:N'-diacetyl-5:6-dihydro-benzo(c)cinnoline may be obtained as follows:

40 parts by weight of 2:2'-dinitro-diphenyl, 950 parts by volume of ethanol, 30 parts by volume of water, 12 parts by volume of potassium hydroxide and 0.2 part by weight of platinum oxide are subjected to hydrogenation in an autoclave fitted with a stirrer at a hydrogen pressure of 50 atm. The reaction is exothermic and the temperature is maintained between 20° and 30° by external cooling. At the end of about one hour the absorption of hydrogen stops. The mixture is stirred for a further one to two hours at a hydrogen pressure of about 30 atm., the pressure is then reduced to atmospheric pressure, and the 5:6-dihydro-benzo(c)cinnoline obtained in a good yield is oxidised to benzo(c)cinnoline by passing air through the mixture at elevated temperature. The ethanol is then evaporated and the residue is treated with 500 parts by volume of 2 N hydrochloric acid. The benzo(c)cinnoline which dissolves in the form of its hydrochloride is precipitated, after removal of small quantities of impurities by filtration, in crystalline form by means of ammonia and then filtered off by suction. By dissolving this product in 300 parts by volume of boiling methanol, adding 2 parts by weight of activated charcoal to the solution, filtering the hot solution and cooling the solution, 20 parts by weight of benzo(c)-cinnoline are obtained in pure form.

1.8 parts by weight of the benzo(c)-cinnoline obtained as described above are hydrogenated in 10 parts by volume of glacial acetic acid and 4 parts by volume of acetic anhydride in the presence of 0.005 part by weight of platinum oxide at 20° and at atmospheric pressure. The absorption of hydrogen stops at the end of about ¾ hour. The reaction mixture is allowed to stand over night and is then heated at 100° for half an hour. After cooling, 100 parts by volume of water are added to the reaction mixture. By extracting with chloroform 2.34 parts by volume of an oily residue are obtained. 25 parts by volume of methanol are added to this residue and the mixture is allowed to stand at −17° to cause the separation of 0.42 part by weight of crystalline N:N'-diacetyl - 5:6 - dihydro-benzo(c)cinnoline. The mother liquor contains a large quantity of the mono-acetyl compound which, after drying, is converted into the di-acetyl compound by heating together with 6 parts by volume of acetic anhydride for 4 hours at 100°. On recrystallisation from methanol the di-acetyl compound is obtained in the form of colourless prisms melting at 169–170°.

*Example 12*

By condensing diethyl ethyl-malonate with N-acetyl-5:6-dihydro-benzo(c)cinnoline in the manner described in Example 11, N:N'-(ethyl-malonyl)-5:6-dihydro-benzo-(c)cinnoline of the formula

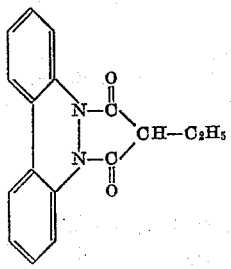

is obtained. On recrystallisation from ethanol and from a mixture of benzene and gasoline the new compound is obtained in the form of light yellow crystals melting at 145°.

*Example 13*

By condensing diethyl n-propyl-malonate with N-acetyl-5:6-dihydro-benzo(c)cinnoline in the manner described in Example 11 N:N'-(n-propyl-malonyl)-5:6-dihydro-benzo(c)cinnoline having the following formula:

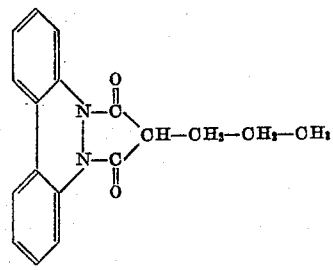

is obtained. On recrystallisation from methanol or from a mixture of benzene and gasoline (mixing ratio 2:1) the new compound is obtained in the form of pale yellow needles melting at 117–118°.

*Example 14*

4.8 parts by weight of diethyl furfuryl-malonate are condensed with 4.5 parts by weight of N-acetyl-5:6-dihydrobenzo(c)cinnoline in a solution of 0.92 part by weight of sodium in 75 parts by volume of ethanol. The reaction mixture is worked up in the manner described in Example 11. On acidification of the combined alkaline layers with acetic acid there is obtained a crystalline precipitate which, after having been filtered off, washed with water and recrystallised from ethanol, yields 4.2 parts by weight of light yellow crystals melting at 147°. The new compound which may also be recrystallised from a mixture of ethyl acetate and gasoline, is N:N'-(furfuryl-malonyl)-5:6-dihydro-benzo(c)cinnoline represented by the following formula

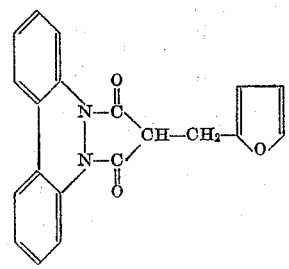

*Example 15*

2.3 parts by weight of N-acetyl-5:6-dihydro-benzo(c)-cinnoline (cf. Example 8 and last paragraph of Example 11), 1.6 parts by weight of isopropyl-malonic acid, 10 parts by volume of benzene and 1 part by volume of phosphorus trichloride are boiled for 4 hours under reflux with exclusion of humidity. After standing over night at 20° the reaction mixture is concentrated in vacuo, the residue is taken up in 50 parts by volume of 1 N caustic soda solution at elevated temperature and, after cooling, the impurities are removed by filtration. The filtered solution is slowly acidified with hydrochloric acid while cooling with ice to cause the separation of an oily precipitate which soon solidifies in crystalline form. The mixture is filtered and the residue is washed with water until the washings are neutral and then dissolved in 120 parts by volume of boiling ethanol. The hot solution is filtered to remove some insoluble material and the filtrate is concentrated to about 30 parts by volume and allowed to crystallise at 0°. In this manner 1.7 parts by weight of pure N:N'-(isopropyl-malonyl)-5:6-dihydro-benzo(c)-cinnoline of the formula

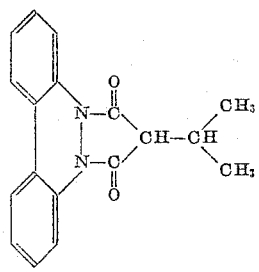

are obtained. This product is identical with that described in Example 4.

*Example 16*

3.60 parts by weight of benzo(c)cinnoline, 4.90 parts by weight of diethyl tetrahydrofurfuryl-malonate, 0.018 part by weight of platinum oxide and a solution of 0.92 part by weight of sodium metal in 75 parts by volume of ethanol are charged into a pressure vessel provided with a stirrer. The air is evacuated from the vessel and the reaction mixture is immediately subjected to a dry hydrogen pressure of 17 atmospheres. The absorption of hydrogen with formation of 5:6-dihydro-benzo(c)cinnoline at room temperature with vigorous stirring is complete at the end of 1½ hours. The hydrogen pressure is reduced to 3 atmospheres and the reaction mixture is heated without stirring first at 130-140° for 2 hours and then at 150 to 160° for 2 hours. The reaction mixture is then allowed to cool over night.

The light yellow alcoholic solution is evaporated to dryness in a partial vacuum and the crystalline pale yellow residue is taken up in 100 parts by volume of water and worked up in the manner described in Example 11.

In this manner 3.65 parts by weight of pure N:N'-(tetra-hydrofurfuryl-malonyl)-5:6-dihydro-benzo-(c)cinnoline melting at 115° are obtained. This product is identical with that obtained according to Example 11.

*Example 17*

By condensing 4.8 parts by weight of the tetrahydropyran derivative of the formula

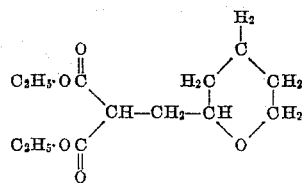

with 4.5 parts by weight of N-acetyl-5:6-dihydro-benzo-(c)cinnoline in the manner described in Example 11 and recrystallising the reaction product from ethanol there are obtained 4.2 parts by weight of the new 5:6-dihydro-benzo(c)cinnoline derivative of the formula

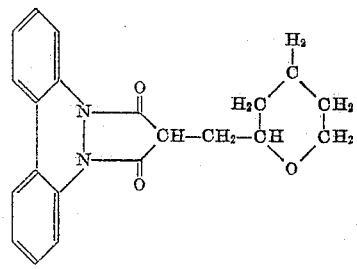

in the form of pale yellow needles melting at 128-129°.

The tetrahydropyran derivative used as starting compound for this condensation may be obtained as follows:

116 parts by weight of commercial tetrahydropyran-2-methanol are stirred with 450 parts by volume of benzene at 25-35° and simultaneously 180 parts by volume of benzene-sulphonic chloride and 72 parts by weight of powdered sodium hydroxide are gradually added. After complete addition the mixture is stirred for a further 2 hours at the same temperature. The reaction mixture is allowed to stand over night and is then thoroughly mixed with 450 parts by volume of water. The aqueous layer is then separated and the benzene solution is shaken with 50 parts by volume of 34% aqueous ammonia. In this manner the unreacted benzene-sulphonic chloride is converted into benzene-sulphamide which can easily be removed from the benzene solution by extraction with dilute caustic soda solution. By concentrating the benzene solution after washing with water, 244 parts by weight of tetrahydropyran-2-methyl benzene-sulphonate are obtained in the form of a brown-yellow oil. 128 parts by weight of this oil are added within 3 hours with stirring and exclusion of humidity to a mixture obtained by dissolving 11.5 parts by weight of sodium in 250 parts by volume of ethanol and subsequent addition of 160 parts by weight of diethyl malonate. The obtained mixture is then boiled for 14 hours under reflux and the main portion of the ethanol is evaporated under reduced pressure. The reaction mass is then distributed between ether and dilute brine. By concentrating the ethereal solution after drying over sodium sulphate an oily residue is obtained which is fractionated in a distilling flask in a vacuum of 11 mm. Hg. After removal of unreacted diethyl malonate by distillation 77 parts by weight of the new tetrahydropyran derivative are obtained in the form of a colourless oil boiling at 156-157°/11 mm. Hg.

*Example 18*

By condensing diethyl n-butoxyethyl-malonate with N-acetyl-5:6-dihydro-benzo(c)cinnoline as described in Example 11 there is obtained N:N'-(n-butoxyethyl-malonyl)-5:6-dihydro-benzo(c)cinnoline of the formula

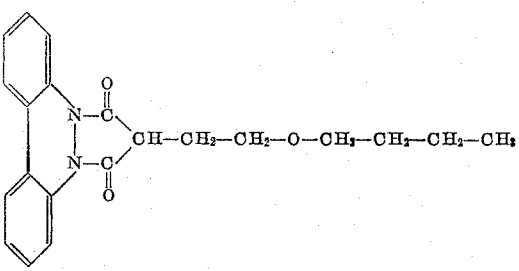

This new compound is readily soluble in water in the form of its sodium salt and may be recrystallised from methanol in the form of pale yellow crystals melting at 71-72°.

*Example 19*

By condensing diethyl phenoxyethyl-malonate with N-acetyl-5:6-dihydro-benzo(c)cinnoline as described in Example 11 there is obtained N:N'-(phenoxyethyl-malonyl)-5:6-dihydro-benzo(c)cinnoline of the formula

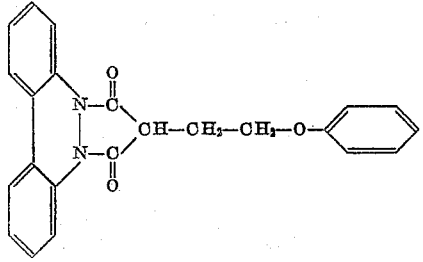

From ethanol or ethyl acetate this product is obtained in the form of pale greenish crystals melting at 153-154°.

*Example 20*

2.5 parts by weight of N:N'-malonyl-5:6-dihydrobenzo(c)cinnoline (prepared as described in Example 9) are heated for 15 minutes under reflux with 5 parts by weight of cyclopentanone. A clear, red solution is formed. After cooling, 30 parts by volume of ethanol are added to the solution to cause the separation of red crystals which are stirred with 50 parts by volume of 2 N sodium carbonate solution, filtered off and washed neutral. On acidification of the filtrate a crystalline precipitate consisting of unreacted N:N' - malonyl - 5:6-dihydro - benzo(c)cinnoline is obtained. The red crystals which are insoluble in sodium carbonate solution consist of N:N' - (cyclopentylidene - malonyl) - 5:6 - dihydro - benzo(c)cinnoline of the formula

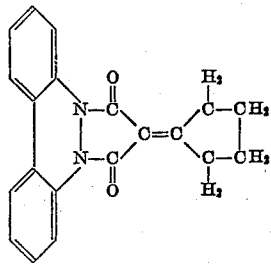

After recrystallisation from a 1:1 mixture of benzene and gasoline this product melts at 193–194°.

The obtained product is dissolved in glacial acetic acid and hydrogenated at room temperature in the presence of a catalytic quantity of platinum oxide. After 1 mole of hydrogen has been absorbed, the catalyst is removed by filtration and the filtrate is evaporated in vacuo. The residue is treated with dilute caustic soda solution and a small quantity of insoluble material is removed by filtration. On acidifying the filtrate with hydrochloric acid a pale yellow crystalline precipitate is obtained. On recrystallisation from ethanol this precipitate yields crystals of N:N'-(cyclopentyl-malonyl)-5:6-dihydro-benzo(c)cinnoline corresponding to the formula

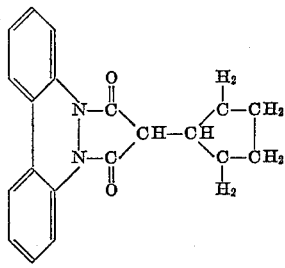

and melting at 124–125°.

*Example 21*

2.5 parts by weight of N:N'-malonyl-5:6-dihydro-benzo(c)cinnoline (prepared as described in Example 9) are heated with 20 parts by volume of cyclohexanone for 1½ hours under reflux. The residue obtained by concentrating the reaction mixture in vacuo is stirred with 50 parts by volume of 2 N sodium carbonate solution at 50°, filtered by suction and washed neutral with water. The material which is insoluble in sodium carbonate solution amounts to 1.35 parts by weight and consists of N:N'-(cyclohexylidene-malonyl)-5:6 - dihydro - benzo(c)cinnoline corresponding to the formula

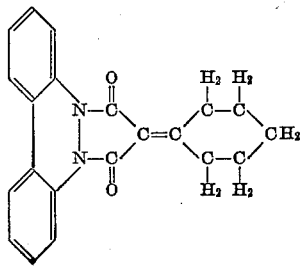

After recrystallisation from a mixture of benzene and petroleum ether (mixing ratio 1:2) or from a mixture of ethyl acetate and petroleum ether (mixing ratio 1:1) this product is obtained in the form of red needles melting at 136°.

By hydrogenating this product in glacial acetic acid in the presence of a catalytic quantity of platinum there is obtained in good yield N:N'-(cyclohexyl-malonyl)-5:6-dihydro-benzo(c)cinnoline of the formula

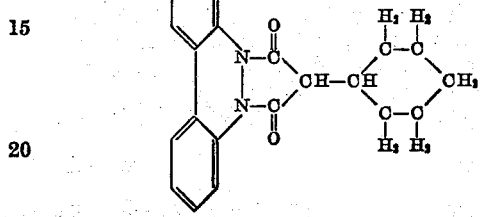

which may be recrystallised from ethanol or a mixture of ethyl acetate and gasoline (mixing ratio 1:3) to obtain pale yellow needles melting at 165°.

*Example 22*

In a distilling flask 0.92 part by weight of sodium metal is dissolved in 75 parts by volume of ethanol with exclusion of humidity and oxygen and 4.5 parts by weight of N-acetyl-5:6-dihydro-benzo(c)cinnoline and 4 parts by weight of diethyl allyl-malonate are added to the solution. The obtained mixture is evaporated to dryness within 2½ hours by heating in an oil bath. The yellow, crystalline, dry residue is dissolved in 50 parts by volume of water and the solution is extracted with chloroform. The alkaline aqueous solution is somewhat concentrated in vacuo, shaken with a small quantity of activated charcoal, filtered and made acid to Congo with hydrochloric acid. The oily precipitate which forms grows crystalline one standing in an ice bath and can then be filtered readily. By recrystallising the crystalline product from 50 parts by volume of ethanol there are obtained 3.65 parts by weight of light brown crystal plates melting at 123°. The brown impurity may be adsorbed on alumina from a solution of the impure crystals in benzene. The obtained pale yellow crystals consist of N:N'-(allyl-malonyl)-5:6-dihydro-benzo(c)cinnoline corresponding to the formula

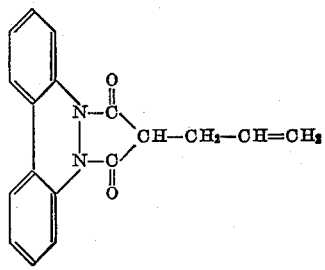

which may be recrystallised from methanol. This new compound may be converted into N:N'-(n-propyl-malonyl)-5:6-dihydro-benzo(c)cinnoline by hydrogenation, for example in glacial acetic acid in the presence of a catalytic amount of platinum at room temperature. The obtained product is identical with that described in Example 13.

What I claim is:

1. A compound selected from the class consisting of a free acid and its salts with therapeutically useful bases, said free acid having the formula

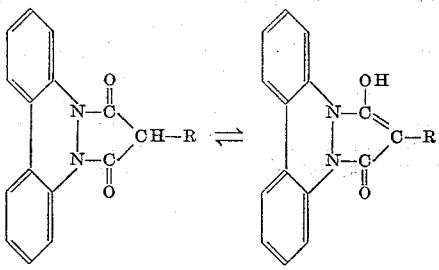

wherein R stands for a member selected from the group consisting of H, lower alkyl, lower alkoxyalkyl, phenoxy-lower alkyl, furfuryl, tetrahydrofurfuryl, tetrahydropyran-2-methyl, lower alkylene, benzyl, cyclohexyl, cyclopentyl, cyclohexylidene and cyclopentylidene.

2. N:N'-(tetrahydrofurfuryl-malonyl)-5:6-dihydro-benzo(c)cinnoline.

3. N:N'-(isopropyl-malonyl)-5:6-dihydro-benzo(c)cinnoline.

4. N:N'-(n-butyl-malonyl)-5:6 - dihydro - benzo(c)cinnoline.

5. Salts with therapeutically useful bases of N:N'-(tetrahydrofurfuryl-malonyl)-5:6-dihydro-benzo(c)cinnoline.

6. Salts with therapeutically useful bases of N:N'-(isopropyl-malonyl)-5:6-dihydro-benzo(c)cinnoline.

7. A process for the manufacture of compounds corresponding to the formula

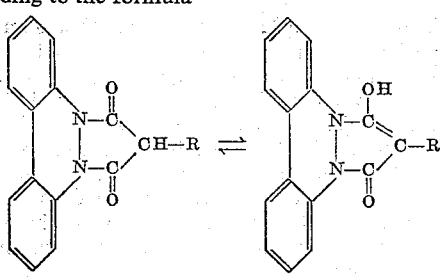

wherein R stands for a member selected from the group consisting of H, lower alkyl, lower alkoxyalkyl, phenoxy-lower alkyl, furfuryl, tetrahydrofurfuryl, tetrahydropyran-2-methyl, lower alkylene, benzyl, cyclohexyl, cyclopentyl, cyclohexylidene and cyclopentylidene, said process comprising condensing, in the presence of an acid condensing agent, a compound of the formula

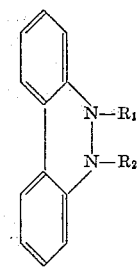

wherein $R_1$ and $R_2$ each represents a member selected from the group consisting of H, lower fatty acid acyl and benzoyl, with a compound of the formula

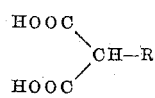

wherein R has the meaning hereinbefore given.

References Cited in the file of this patent
UNITED STATES PATENTS
2,700,671    Hafliger _____ Jan. 25, 1955